US008089242B2

(12) United States Patent
Loudot

(10) Patent No.: US 8,089,242 B2
(45) Date of Patent: Jan. 3, 2012

(54) ELECTRICAL MANAGEMENT DEVICE FOR VEHICLE POWER SUPPLY

(75) Inventor: Serge Loudot, Villiers le Bacle (FR)

(73) Assignee: Renault S.A.S., Boulogne Billancourt (FR)

( * ) Notice: Subject to any disclaimer, the term of this patent is extended or adjusted under 35 U.S.C. 154(b) by 603 days.

(21) Appl. No.: 12/161,569

(22) PCT Filed: Jan. 3, 2007

(86) PCT No.: PCT/FR2007/050605
§ 371 (c)(1),
(2), (4) Date: Oct. 3, 2008

(87) PCT Pub. No.: WO2007/083046
PCT Pub. Date: Jul. 26, 2007

(65) Prior Publication Data
US 2009/0218983 A1    Sep. 3, 2009

(30) Foreign Application Priority Data
Jan. 19, 2006    (FR) .................... 06 50185

(51) Int. Cl.
*H02J 7/00*    (2006.01)
*B60L 9/00*    (2006.01)
*H01L 35/00*    (2006.01)
*H01L 37/00*    (2006.01)
(52) U.S. Cl. ........ 320/101; 320/104; 320/138; 320/139; 136/291; 180/65.29; 180/2.2; 323/906
(58) Field of Classification Search .................. 320/104, 320/138, 139; 136/291; 180/165.29, 2.2; 323/906
See application file for complete search history.

(56) References Cited

U.S. PATENT DOCUMENTS

| | | | | |
|---|---|---|---|---|
| 4,560,916 A * | 12/1985 | Yoshiyuki et al. | ............... | 322/86 |
| 5,493,155 A * | 2/1996 | Okamoto et al. | ............... | 307/45 |
| 5,680,907 A * | 10/1997 | Weihe | ............. | 180/2.2 |
| 5,986,429 A | 11/1999 | Mula, Jr. | | |
| 6,172,486 B1 * | 1/2001 | Campagnuolo et al. | ...... | 320/141 |
| 6,239,508 B1 * | 5/2001 | Faris et al. | ..................... | 307/9.1 |
| 6,897,370 B2 * | 5/2005 | Kondo et al. | ................. | 136/243 |
| 7,000,395 B2 * | 2/2006 | Wai et al. | ......................... | 60/698 |
| 7,068,991 B2 * | 6/2006 | Parise | ......................... | 455/343.1 |
| 7,269,036 B2 * | 9/2007 | Deng et al. | ...................... | 363/49 |
| 2005/0018454 A1 * | 1/2005 | Deng et al. | ...................... | 363/49 |

OTHER PUBLICATIONS

IGBT Tutorial by Dodge, Jonathan and Hess, John Apt0201 Rev. B Jul. 1, 2002, p. 2.*

Yaow-Ming, Chen et al, "Development of Multi-port Converters for Hybrid Wind-Photovoltaic Power System", Proceedings of IEEE Region 10 International Conference Onelctrical and Electronic Technology. XP010556356, vol. 1 of 2, pp. 804-808, (2001).

* cited by examiner

*Primary Examiner* — Patrick Assouad
*Assistant Examiner* — Steve T Chung
(74) *Attorney, Agent, or Firm* — Oblon, Spivak, McClelland, Maier & Neustadt, L.L.P.

(57) ABSTRACT

An electrical management device for a vehicle power supply that includes a single converter to minimize the number of components required to simultaneously control two energy sources, such as a photovoltaic source and a thermoelectric source, on board a motor vehicle that includes at least one electrical energy storage battery.

28 Claims, 3 Drawing Sheets

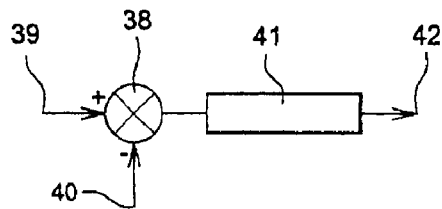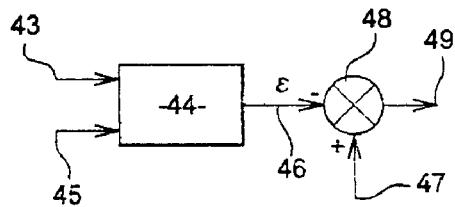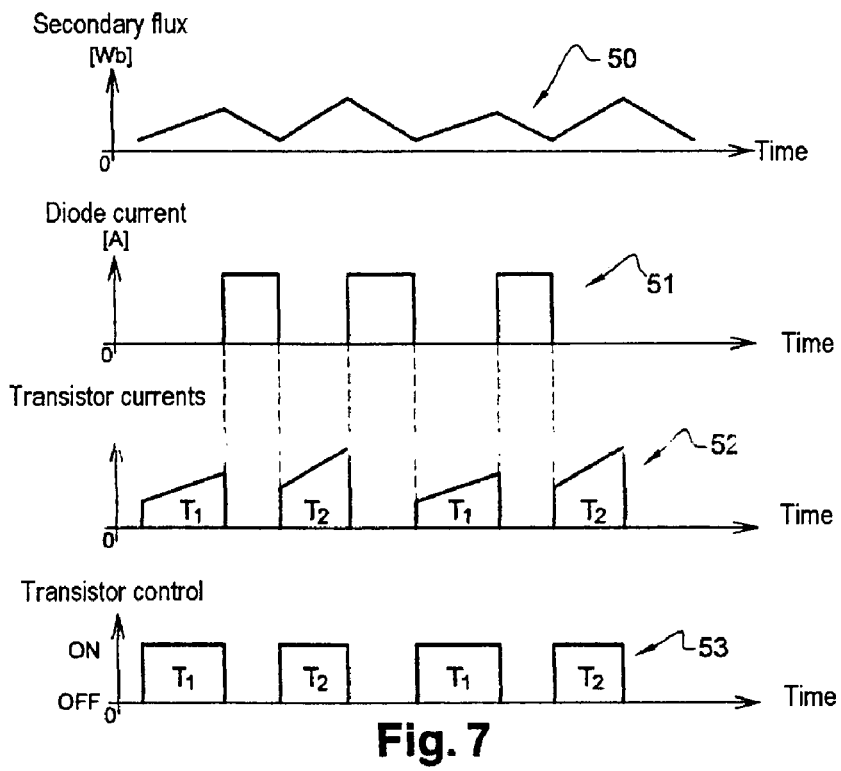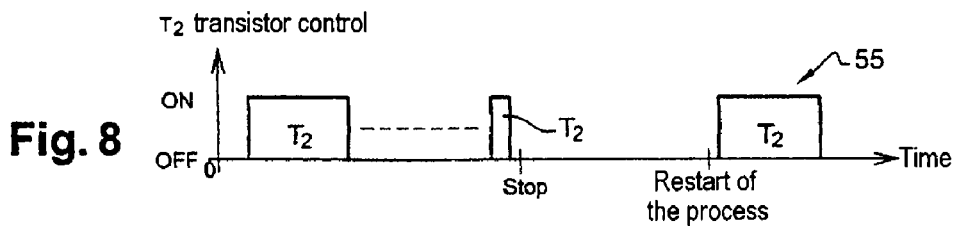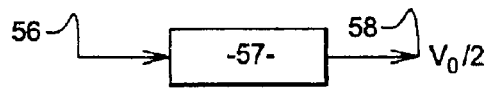

ELECTRICAL MANAGEMENT DEVICE FOR VEHICLE POWER SUPPLY

The present invention relates to an electrical management device for vehicle electrical power supply.

The possibility of supplying electrical power on board an automobile vehicle when its internal combustion engine is stopped offers numerous advantages, amongst which are:

the supply of electrical services when the internal combustion engine is stopped, including during long-term parking;

keeping the battery charged;

the possibility of maintaining the largest number of electronic devices (notably multimedia) in standby; and other services.

Furthermore, if this supply of power originates from 'free' sources, in other words with no fuel consumption, such as solar sensors or thermo-generators (which use part of the heat lost by the internal combustion engine, for example), this supply of power improves the energy efficiency of the vehicle.

Known Solutions

Applications that are not very widespread exist where solar sensors are installed on the roof of the vehicle and thus provide air flow to the passenger compartment when the vehicle is parked in the sun. This allows the temperature inside the passenger compartment to be maintained at a level similar to that outside thus affording an appreciable thermal comfort when the vehicle is taken. Furthermore, there have been a few communications on truck prototypes equipped with thermo-generators made from bismuth telluride on the engine sump or on the exhaust. This was apparently described with the aim of having a supplementary source of electrical power associated with an improvement in the energy efficiency.

In the document U.S. Pat. No. 5,479,557, a system is described in which the power from solar cells is used to supply either the air flow to the vehicle passenger compartment while it is parked or to keep the battery charged. The two functions are not envisioned simultaneously. No other power source (for example thermoelectric) is envisioned.

In the document US-A-2002/000243, a system is described providing an identical functionality to that described in the document U.S. Pat. No. 5,479,557, but with the use of a DC/DC converter as an interface between the solar generator and the DC motor for the air flow to the passenger compartment or the battery to be kept charged.

In the document US-A-2002/000785, a system is described providing an identical functionality to that described in the document US-A-2002/000243, but the DC/DC converter firstly supplies the 42 volt battery from which the power required for the air flow motor is taken.

In the document U.S. Pat. No. 5,779,817, a system is described providing an identical functionality to that described in the document U.S. Pat. No. 5,479,557 with switching between solar cells depending on whether power is being supplied to the air flow or the battery is being kept charged. No control by power electronics is envisioned; the switching is achieved by relays.

Main Features of the Invention

A first object of the invention is to manage, simultaneously or independently, two DC power sources of different kinds, typically solar cells and thermo-generators, where each of these sources may be based on any given technology (by way of example: technology based on single-crystal silicon or polysilicon for solar cells, and technology based on thermo-couples such as Te—Bi, Zn—Sb, or Skutterudite for the thermo-generator).

According to another object of the invention, this management, achieved using one particular DC/DC converter, allows the maximum power that can be supplied by each source at each moment under variable environmental conditions to be absorbed. Considering the low efficiency of these generators, such a management provides an optimal operation for an automobile application.

Advantages of the Proposed Solution

The solution allows a supplementary supply of power to be provided with the following advantages:

fuel saving: indeed, all or part of the electrical power produced does not come from the internal combustion engine or from a fuel cell, but from the combustion of a fuel, maintaining generation of electricity without supply of fuel and without emissions, use of electrical devices and accessories or re-charging of their batteries when the internal combustion engine is stopped, keeping the battery charged during prolonged periods of parking (several weeks), when the vehicle is in a state with the internal combustion engine stopped, and during prolonged periods of parking, maintaining certain electrical services, maintaining in standby certain pieces of electronic equipment, for thermal comfort, for multimedia resources, etc., the converter which serves as an interface allows each source to be freed from the constraint of supplying a voltage compatible with the battery voltage. Thus, each source is designed at its optimum power/volume. Indeed, for the serial/parallel configuration of elementary elements that form each generator, the number of elements in series is no longer conditioned by the battery. The power (in other words the number of elements, the volume, and hence the cost) is designed at just the level required, the possibility of having a source independent from the main power network of the vehicle allows various devices to be powered during the testing period or the adjustment period during which the main power network is likely to be disturbed and thus to cause malfunctions of these devices.

The management of sources of different kinds ensures an improved availability of the power. Furthermore, when the two sources are available, the useful power will be enhanced.

For this purpose, the present invention relates to an electrical management device for vehicle electrical power supply, characterized in that it comprises a single converter so as to minimize the number of components required for simultaneously controlling two power sources, such as a photovoltaic source and a thermoelectric source, on board an automobile vehicle which comprises at least one electrical energy storage battery.

According to one aspect of the invention, the converter comprises a means for executing a control law depending on the maximum electrical power of each source for maintaining a determined level of charge in said electrical storage battery.

According to one aspect of the invention, the means of the converter for executing a control law uses circuits that are insensitive to the variations in the voltage of said electrical storage battery.

According to one aspect of the invention, the means of the converter for executing a control law comprises a means for managing the control of the power produced by the thermoelectric source in order to maintain it at maximum power and a reference voltage management means.

According to one aspect of the invention, said electrical storage battery is chosen from amongst at least the main battery of the vehicle, and/or a specialized battery, in such a manner that the management device operates even if the internal combustion engine of the vehicle is stopped, and even if all of the consumer electrical circuits are turned off.

According to one aspect of the invention, the converter is equipped with a first resource of the converter preventing the battery, whose high potential would be higher than that of an electrical power source, from discharging itself into said source.

According to one aspect of the invention, said first resource of the converter is composed of two diodes whose cathodes are connected together and whose anodes are respectively connected to the high potential of each first or second power source, the common connection of the cathodes being connected to the battery.

According to one aspect of the invention, the converter is equipped with a second resource for producing a voltage and/or dissipated current electrical configuration signal for the first and/or the second electrical power source.

According to one aspect of the invention, the converter comprises two inputs respectively connected to a first filter connected to the highest potential of the first power source and to a second filter connected to the highest potential of the second power source.

According to one aspect of the invention, each filter is a T-configured filter respectively composed of a series inductance, and a parallel capacitor.

According to one aspect of the invention, the two filters are calculated in such a manner that the inductances are formed by the connection cables themselves.

According to one aspect of the invention, the converter comprises a controller and a means for combining the currents produced by the two sources.

According to one aspect of the invention, the means for combining the currents comprises a transformer with two cores and three windings:
a first winding connected to the input of the converter connected to the output of the filter of the second source,
a second winding connected to the input of the converter connected to the output of the filter of the first source, and
a third winding connected to the output of the current combining means.

According to one aspect of the invention, the first winding comprises a second terminal which is connected to a switching terminal of a switching means controlled by the output signal coming from an output of the controller, and in that the second winding comprises a second terminal which is connected to a switching terminal of a switching means controlled by the output signal coming from an output of the controller.

According to one aspect of the invention, each of the switches is composed of a power transistor of the MOS type whose gate is connected to the corresponding control signal terminal of the controller, whose drain is connected to a second terminal of one of the first or second windings of the transformer and whose source is connected to the low potential line of the circuit of the invention.

According to one aspect of the invention, a first high potential terminal of the third winding of the transformer is connected to the anode of a conduction diode whose cathode is respectively connected to the battery and also to a first terminal of a storage capacitor whose second terminal is itself connected to the low potential line of the circuit.

According to one aspect of the invention, the controller comprises two independent regulation loops installed in such a manner as to optimally determine the control regime for each transistor or switching means.

According to one aspect of the invention, each regulation loop cooperates with:
a reference voltage generator designed to place the regulation into a mode at least close to the supply of maximum electrical power,
one or the other of the input terminal of the controller in order to take the instantaneous voltage at the output of the filter associated with the first thermoelectric source; or of the input terminal of the controller in order to take the instantaneous voltage at the output of the filter associated with the second source using photovoltaic cells.

According to one aspect of the invention, each of the inputs of the controller is connected to a circuit generating a mean value of the instantaneous measurement voltage of one or the other of the two sources, the output of the mean voltage generating circuit being connected to the input terminal of the regulation loop in question.

According to one aspect of the invention, each regulation loop comprises a subtractor circuit for the signals representative of the adjustment threshold for the regulation of the input terminal, from which value the subtractor circuit subtracts the instantaneous or mean value of the voltage from the source transmitted to the input terminal, then a corrector circuit which comprises a control pulse-train generator for a switching means.

According to one aspect of the invention, the pulse-train generator is equipped with means for determining the frequency, the duty cycle, the amplitude and the waveform of the pulse train.

According to one aspect of the invention, the corrector circuit comprises a means for varying its duty cycle.

According to one aspect of the invention, the controller is equipped with a circuit for calibration of the reference voltage which produces an interruption at regular intervals of a switching means in order to update the reference voltage applied to the terminal.

According to one aspect of the invention, the calibration circuit also comprises a means for producing an interruption of the switching of the MOS transistor after a phase of gradual reduction in the conduction time until it reaches zero.

According to one aspect of the invention, the management device comprises a temperature sensor, the controller cooperating with a circuit for calculating the reference voltage Vo/2 deduced directly from the temperature by means of a function for converting the temperature into a reference voltage of the form Vo/2.

According to one aspect of the invention, for the second source of electrical power using solar cells, a temperature sensor and/or a sunshine sensor are implemented in order to correct the reference voltage V0-ε by means of a circuit for calibrating the regulation reference voltage for the second source.

According to other aspects of the invention:
the circuit for calibrating the regulation reference voltage for the second source using photovoltaic cells comprises a memory with a single input indexed onto the value representative of a measurement of the temperature,
the circuit for calibrating the regulation reference voltage for the second source using photovoltaic cells comprises a memory with a single input indexed onto the value representative of a measurement of the level of sunshine,
the circuit for calibrating the regulation reference voltage for the second source using photovoltaic cells comprises a memory with two inputs respectively indexed onto the value representative of a measurement of the temperature and onto the value representative of a measurement of the level of sunshine.

According to one aspect of the invention, the memory produces an offset value E for the reference voltage and said offset value is produced at the negative input of a subtractor whose positive input is connected to a circuit generating the voltage V0 characteristic of the maximum power of the photovoltaic cell generator, the circuit generating the voltage V0 characteristic of the maximum power of the photovoltaic cell generator cooperating with a switching means or means for connecting photovoltaic cells, in such a manner that the current and the voltage delivered by the photovoltaic generator operates within desired characteristics.

Other advantages and features of the invention will be better understood with the aid of the description and the appended figures amongst which:

FIG. 5 is a block diagram of a circuit used in the electrical management device of the second embodiment of the invention;

FIG. 6 is a block diagram of another circuit used in the electrical management device of the second embodiment of the invention;

FIG. 7 is a series of four graphs of four control parameters of the device of the invention;

FIG. 8 is a graph allowing the operation of another control circuit of the device of the invention to be explained; and FIG. 9 is a block diagram of another circuit used in the electrical management device of the second embodiment of the invention.

DETAILED DESCRIPTION

Figure 1:
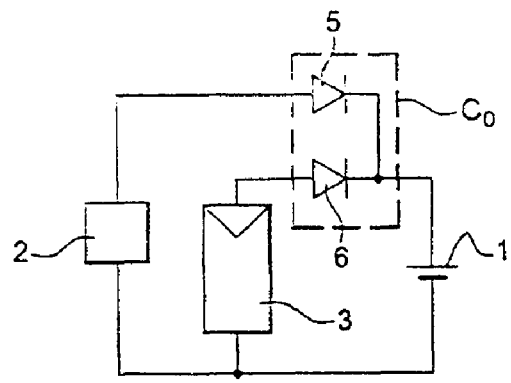
FIG. 1 is a circuit diagram of a management device according to a first embodiment of the invention.

According to the invention, there are several ways of simultaneously managing two separate auxiliary power sources (solar and thermoelectric). The simplest, but least effective, way is described by FIG. 1. In FIG. 1, a first embodiment of the device of the invention is shown. The vehicle, not shown, comprises a battery 1. This battery can be the main battery of the vehicle, normally powered by an alternator driven by the conventional internal combustion engine of the vehicle. In one variant, the battery 1 is a specialized battery which is connected via a circuit not shown in FIG. 1 to the on-board power supply network. In one or the other case, whether the battery 1 is the main battery of the vehicle or whether it is a specialized battery, the management device of the invention operates even if the internal combustion engine of the vehicle is stopped, and even if all of the consumer electrical circuits are turned off.

The management device of the invention comprises a single converter, indicated by the letter C, which is connected by two separate inputs, on the one hand, to a first source of electrical power 2 and, on the other hand, to a second source of electrical power 3. In one preferred embodiment, the first electrical power source is composed of a thermo-generator.

The second electrical power source is composed of a plurality of photovoltaic cells, for example disposed on the roof panel of the vehicle.

The converter C of the invention is equipped with one or more means, or cooperates with the latter, depending on whether they are integrated into the converter or simply electrically connected to the exterior of the latter. The first resource of the converter prevents the battery or the other source, whose high potential would be higher than that of an electrical power source, from discharging itself into said source. In the embodiment in FIG. 1, this means is composed of the two diodes 5 and 6.

A second resource (not shown) of the converter C allows a voltage and/or dissipated current electrical configuration signal to be produced for the first and/or the second electrical power source. Particularly in the case of a battery of photovoltaic cells (case of the second source 3), on the basis of such a configuration signal, it is possible to adapt groups of photovoltaic cells in series and/or in parallel by switching, in such a manner as to, in the case of photovoltaic cells, choose determined values of current and of voltage to be available at the corresponding input of the converter C, these determined values corresponding to optimal operation of both the converter C and of the battery 1 when it is recharged. The same electrical configuration resource is provided for the first thermo-generator source 2.

In the first embodiment of the device of the invention shown in FIG. 1, the single converter comprises a first 5 and a second 6 diode. The anode of the first diode 5 is connected to a point of high potential of the source 2 formed by a thermo-generator. The anode of the second diode is connected to a point of high potential of the source 3 formed by a battery of photovoltaic cells. The cathodes of the first 5 and second 6 diodes are connected together at the output of the single converter C such that it is connected to the high potential terminal of the battery 1. The low potential terminal of the battery 1 is connected to both the low potential terminals of the first 2 and of the second 3 electrical power sources, respectively.

This topology does however have the drawbacks described hereinbelow.

The photovoltaic and thermoelectric sources must be configured so as to supply a voltage compatible with that of the battery, which limits the possibilities for optimization of the arrangement of the elementary cells (in series and/or in parallel) for a required power and an allocated volume.

The power sources are not well used. The reason for this is that the absence of any control means that they cannot be used at their maximum power points under all conditions (level of sunshine for the solar cells and temperature difference for the thermo-generators).

In a second embodiment, the invention allows the solar and thermoelectric power sources to be managed at their maximum available power irrespective of the environmental conditions (degree of sunshine and temperature difference) which have a major influence on this maximum power. The circuit in FIG. 2 details the layout of the converter used.

Figure 2:
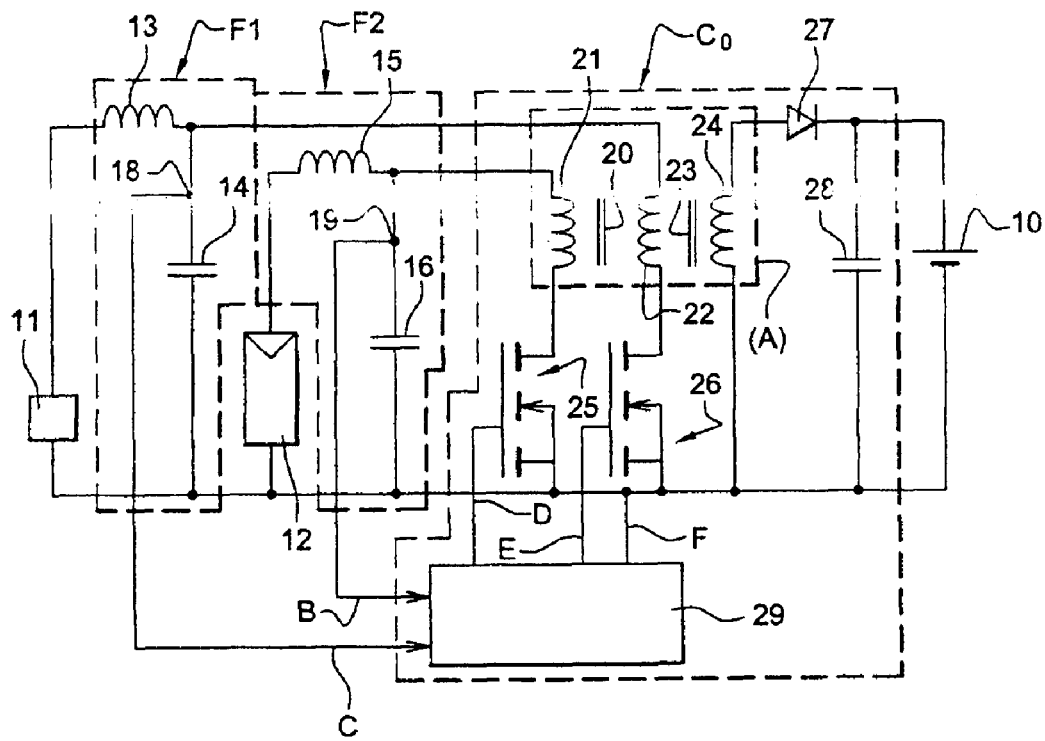
FIG. 2 is a circuit diagram of an electrical management device according to a second embodiment of the invention.

The device in FIG. 2 comprises, as in the case of FIG. 1, a vehicle battery 10 whose lowest potential is respectively connected to the lowest potential of a first electrical source 11 formed by a thermo-generator and of a second electrical source 12 formed by a battery of photovoltaic cells.

The converter of the second embodiment of the invention is inserted between the two sources 11 and 12, on the one hand, and the battery 10, on the other. It comprises a conversion part per se C0 having two inputs respectively connected, on the one hand, to a first filter F1 connected to the most positive potential of the first power source 11 and, on the other, to a second filter F2 connected to the most positive potential of the second power source 12. In one particular embodiment, each filter is a T-configured filter respectively composed of an inductance in series, such as the inductances 13 or 15, and of a parallel capacitor, such as the capacitors 14 and 16. In one particular embodiment, the two filters F1 and F2 are calculated in such a manner that the inductances 13 and 15 are formed by the connection cables themselves.

Furthermore, the converter per se C0 comprises a controller 29 that comprises at least two input terminals, respectively B connected to the output of the filter F1 protecting the first source 11 and C connected to the output of the filter F2 protecting the second source 12. The controller 29 comprises at least two output terminals, D and E respectively, which will be described hereinafter.

The controller C0 then comprises a means A for combining the currents produced by the two sources 11 and 12. Preferably, the means for combining the currents A comprises a transformer with two cores and three windings:

- a first winding 21 connected to the input of the converter C0 connected to the output of the filter F2 of the second source 12,
- a second winding 22 connected to the input of the converter C0 connected to the output of the filter F1 of the first source 11, and
- a third winding 24 connected to the output of the current combining means A.

The windings 21 and 22 are magnetically coupled by a core 20 and the windings 22 and 24 are coupled by a core 23, where the two cores 20 and 23 can be associated within a single magnetic circuit in the manner of three-phase transformers.

The first winding 21 comprises a second terminal which is connected to a switching terminal of a switching means 25 controlled by the output signal coming from the output D of the controller 29. The second winding 22 comprises a second terminal which is connected to a switching terminal of a switching means 26 controlled by the output signal coming from the output E of the controller 29.

Depending on the style of the state of the corresponding output signal of the controller 29, each of the switches 25 or 26 can be open 'ON' or closed 'OFF'. Each switch 25 or 26 comprises a control terminal respectively connected to the output D and to the output E of the controller 29. Each switch 25 or 26 lastly comprises a second switching terminal which is connected to the low potential line of the circuit of the invention.

In one preferred embodiment, each of the switches 24 or 25 is composed of a power transistor of the MOS type whose gate is connected to the corresponding control signal terminal of the controller 29, whose drain is connected to a second terminal of one of the first or second windings of the transformer A and whose source is connected to the low potential line of the circuit of the invention.

A first high potential terminal of the third winding 24 of the transformer A is connected to the anode of a conduction diode 27 whose cathode is respectively connected to the output of the circuit of the invention intended to be connected to the battery 10 and also to a first terminal of a storage capacitor 28 whose second terminal is itself connected to the low potential line of the circuit of the invention.

Finally, the controller 29 is referenced, from the point of view of the electrical voltages, via a line F connecting to the low potential line of the circuit of the invention. The positive power supply line, allowing the internal circuit of the controller 29 to be biased, has not been shown. The controller 29 does however comprise a means for generating a positive bias power supply voltage and a circuit that transforms input signals on the inputs B and C into control signals on these outputs D and E.

The advantages of the second embodiment of the invention are the following. First of all, the two sources (thermo-generator and solar cells) are connected to the same converter that provides their simultaneous management.

The filtering inductances 13 and 15 are, in practice, the inductances of the cabling between the sources and the converter. Indeed, the operational and architectural constraints mean that the sources are generally far away from the converter (the solar cells are typically on the roof of the vehicle whereas the thermo-generators are typically on the engine sump or exhaust). The configuration takes advantage of this constraint in order to eliminate inductive elements (potentially voluminous and costly) from the circuit.

The rest of the elements (aside from the battery) are physical components that form part of the converter.

This topology allows certain components to be allocated to the two generators. Amongst these are:

- the transformer A whose secondary winding is shared;
- the output diode 27;
- the filtering capacitor 28 at the output.

In this configuration, the auxiliary sources, which are the thermo-generator 11 and the solar cells 12, charge the battery and/or power accessories while the engine of the vehicle and any other source consuming fuel may be stopped (parking or hybrid operating in electric mode for example).

Implementation

The basic principle of the operation imposed by the controller 29 is that of the switch-mode power supply with energy recovery or 'flyback' converter. The magnetic circuit 20, 23 is alternately magnetized by one, 11, and the other, 12, source, thanks to alternating sequences of operation of the electronic switches 25 and 26. FIG. 1 details the sequencing of the control signals produced by the controller 29 and applied to the gate electrodes of the MOS transistors 25 and 26.

The magnetic circuit is alternately magnetized by each transistor 25 or 26 for a period coming from the regulation obtained from the mean voltage measured on their respective filtering capacitors (14 and 16). The operation can be both continuous and intermittent depending on whether the magnetic flux in the secondary winding can go to zero or not.

Figure 3:
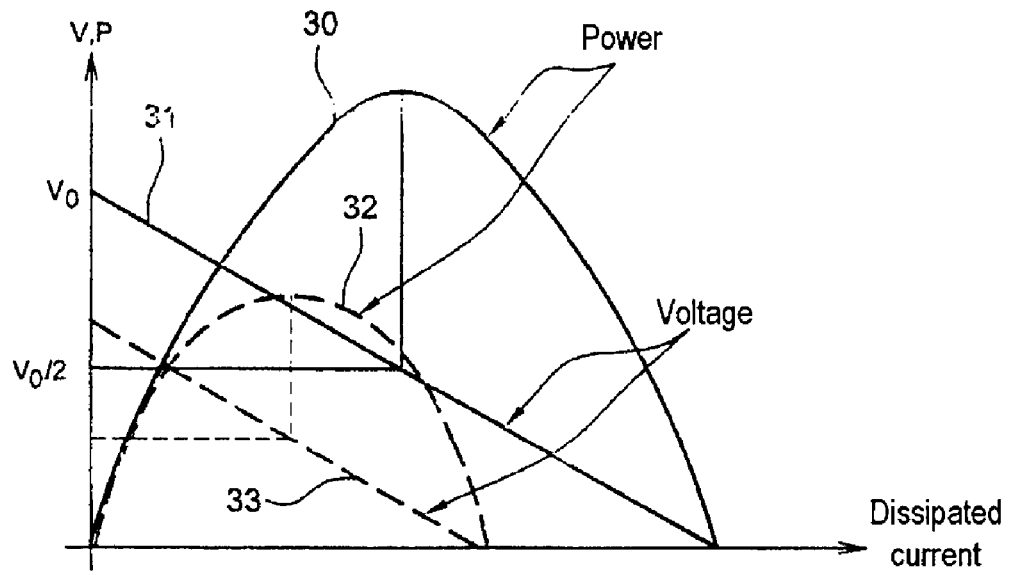
FIG. 3 is a graph on which the voltage and power characteristics are plotted of a source of a first type used in the electrical management device of the invention.

The voltage and power characteristics of a thermo-generator electrical source are shown in FIG. 3 for two temperature gradients. For a first temperature gradient T1, the power characteristic 30 and the voltage characteristic 31 are shown. The voltage characteristic is of the form:

$$V = V0 - r \times I$$

in which V0 is the voltage of the thermoelectric generator at open circuit, r is the internal resistance of the thermoelectric generator and I is the current dissipated by the thermoelectric generator source into a receiver circuit. The power dissipated by such a generator is given by an equation of the form:

$$P = V \times I$$

$$P = I \times (V0 - r \times I)$$

which exhibits a maximum for the value I0=V0/2r.

For another temperature gradient T2, the pair of characteristics in power 32 and in voltage 33 of the same generator are shown. The variation between the two gradients is established by the open-circuit voltage V0=V0(T), where T is the temperature gradient of the generator.

The control of the electrical management device of the invention is executed based on a maximum power law in such a manner that the current dissipated by the thermoelectric generator source is therefore of the form: I0(T)=V0(T)/(2×r) which can therefore be pre-determined and recorded in the controller 29.

Figure 4:
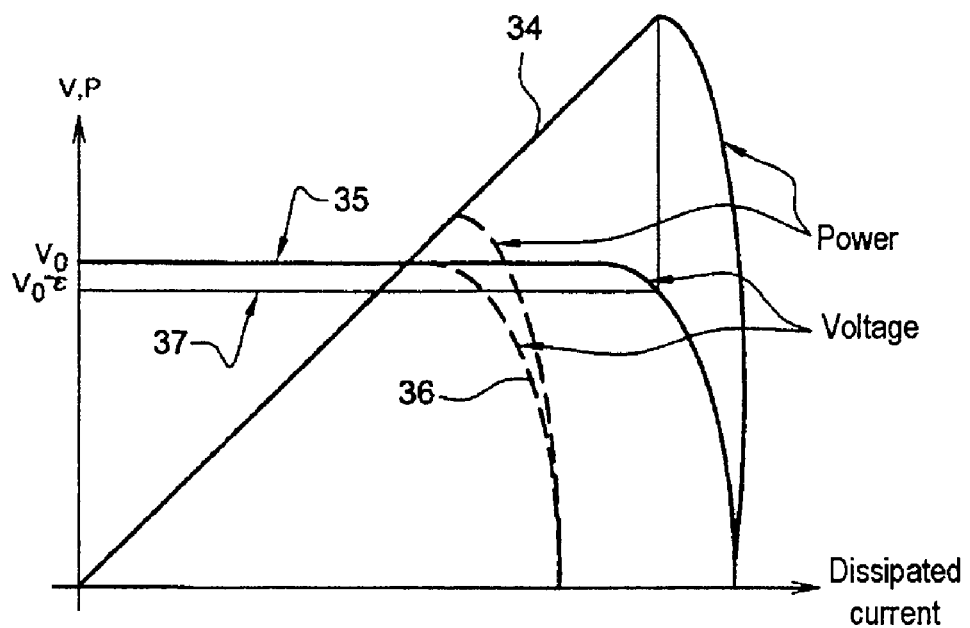
FIG. 4 is a graph on which the voltage and power characteristics are plotted of a source of a second type used in the electrical management device of the invention.

In FIG. 4, the voltage and power characteristics are shown of an electrical source using photovoltaic cells for two different sunshine levels.

There are a pair of characteristics in power 34 and in voltage 35 for a first sunshine level, then there are a pair of characteristics in power 36 and in voltage 37 for a second sunshine level.

The value V0 is directly linked to the avalanche voltage of the photovoltaic cells, and the voltage delivered by the photovoltaic generator, for a given level of sunshine, remains substantially constant as long as the dissipated current does not exceed a limiting value dependent on the sunshine exposure level of the photovoltaic cells. Since the power is the result of the product V×I of the measured voltage and of the dissipated current, it is itself linear up to the maximum current value.

In view of the electrical characteristics of each source, the conduction time for each transistor (or its duty cycle) is regulated by a duty cycle regulation circuit internal to the controller 29 so as to be at the maximum power operating point for each generator, this being:

V0/2 for the thermo-generator, as shown in FIG. 3 which shows the current/power characteristics of a thermo-generator for two different temperature gradients (the temperature difference applied to the thermo-generator is greater for the solid line than for the dashed line).

V0-ε for the solar cells, E being a relatively small fraction of V0 so as to keep itself just at the maximum power point when the voltage starts to drop, as shown in FIG. 4.

Because the electrical management device of the invention works with two electrical sources with different characteristics, its controller 29 must comprise two independent regulation loops whose characteristics are specified for optimally determining the control regime for each transistor or switching means 25, 26.

FIG. 5 shows the schematic circuit diagram of one or the other of these loops. An input terminal 39 of one or the other of the two loops implemented within the controller 29 (FIG. 2) is connected to a reference voltage generator designed to place the regulation into a mode at least close to the supply of maximum electrical power. As a result, as has been explained above, the reference voltage applied to the input 39 of the regulation loop is:

V0/2 for the regulation loop on the first thermo-generator source 11;

V0-ε for the regulation loop on the second source 12 using photovoltaic cells.

A second input terminal 40 of one or the other regulation loop is respectively connected:

to the input terminal C of the controller 29 in order to take the instantaneous voltage at the output of the filter F1 associated with the first thermo-generator source;

to the input terminal B of the controller 29 in order to take the instantaneous voltage at the output of the filter F2 associated with the second source using photovoltaic cells.

In one particular embodiment, each of the inputs B or C of the controller 29 is connected to a circuit generating a mean value of the instantaneous measurement voltage of one or the other of the two sources. The output of the mean voltage generating circuit is then connected to the input terminal 40 of the regulation loop in question.

Each regulation loop then comprises a subtractor circuit 38 for the signals representative of the adjustment threshold for the regulation of the input terminal 39, from which value the subtractor circuit 38 subtracts the instantaneous or mean value of the voltage from the source transmitted to the input terminal 40. The output value is then addressed to a corrector circuit 41 which comprises a control pulse-train generator for a MOS transistor gate or, more generally, for any switching means 25 or 26 depending on whether the regulation loop is assigned to the first source 11 or to the second source 12.

The pulse-train generator is equipped with means for determining the frequency, the duty cycle, the amplitude and the waveform of the pulse train. In one preferred embodiment, frequency, amplitude and waveform are kept constant whereas the corrector 41 comprises a means for varying the duty cycle, in other words the ON time, of the transistor whose gate is connected to the output terminal D of the controller 29 connected to the output 42 of the regulation loop for the thermoelectric generator for the MOS transistor 25 or to the output terminal E of the regulation loop for the photovoltaic generator for the MOS transistor 26.

FIG. 7 shows four timing diagrams of an example of operation of the circuit in FIG. 2 whose controller 29 is equipped with two regulation loops analogous to the loop in FIG. 5. The curve 50, on the upper graph, represents the variation of the magnetic flux in the secondary winding at the output of the transformer A. The curve is composed of a periodic sawtooth sequence at the switching frequency of the switching means 25 and 26. The curve 51, on the following graph, represents the time variation of the current in the output diode which is a periodic square-wave function, periodic at the switching frequency of the switching means 25 and 26.

The curve 52, on the following graph, represents the time variation of the current in one or the other of the switching means 25 or 26 when they are composed of a MOS transistor, which is a trapezoidal-wave periodic function, periodic at the switching frequency of the switching means 25 and 26.

The curve 53, on the following graph, represents the time variation of the gate control voltage for each MOS transistor 25 or 26, which is a square-wave periodic function, periodic at the switching frequency of the switching means 25 and 26.

During the conduction time determined by the regulation loop of the controller 29 described by means of FIG. 5, each transistor concerned is placed in a conducting 'ON' state (graph 53). In response, the current flowing through the drain-source channel of the transistors turned ON, it being understood that only one could be turned ON, increases. The result of this is that the magnetic energy is stored in the primary windings of the transformer A (rising parts of the curve 50). Then, when the circuit (or primary circuits) is (are) opened, the current falls to zero in the primary (graph 52) and the energy stored in the primaries is simultaneously recovered in the secondary winding (falling part of the graph 50); the secondary current can flow in the output diode which blocks the secondary during the magnetic charging period.

It is thus possible to produce a voltage across the terminals of the output capacitor 28 of the device of the invention, so that it can participate in the recharging of the battery 1.

The conduction time of the transistor (in other words the time during which it is ON) can be independent of the demagnetization time (in other words the time between its switching OFF (blocked) and the triggering ON of the other transistor) or act directly on the duty cycle (ratio between the time where the transistor is ON and the duration of one period).

The voltage Vo varies greatly for the thermo-generator with the environmental conditions. This is essentially due to the differences in temperature. The setpoint voltages applied to the input terminal 39 of the subtractor 38 of the regulation loop assigned to the control of the first source 11 should therefore be calibrated. For this purpose, the controller 29 is equipped with a circuit for calibration of the reference voltage (not shown) which produces an interruption at regular intervals of the MOS transistor 25 that controls the thermo-generator for the time it takes the corresponding filtering capacitor 14 to charge up to the voltage Vo. This voltage is measured by the calibration circuit, then the reference voltage applied to the terminal 39 is updated. At that moment, the calibration circuit produces an activation signal which enables the procedure for switching and transferring the power of the generator in question onto the regulation loop to be restarted.

In order to prevent the energy contained in the filtering inductance 13 from overcharging the capacitor 14 and causing errors, the calibration circuit also comprises a means for producing an interruption of the switching of the MOS transistor 25 after a phase of gradual reduction in the conduction time until it reaches zero (referred to as "soft stop") as is shown in FIG. 8.

In another embodiment of the electrical management device of the invention, a temperature sensor is provided. The controller CO then cooperates with a circuit for calculating the reference voltage Vo/2 deduced directly from the temperature by means of a function for converting the temperature into a reference voltage of the form V0/2.

In FIG. 9, the calibration circuit comprises an input terminal 56 to which a signal is applied that is representative of the temperature of the thermo-generator source 11 which is converted by an input signal conversion means into a read address in a pre-programmed table containing, for each conversion value of the temperature signal, a value of the regulation reference voltage V0/2 available at its read terminal 58 which can then be connected to the input terminal 39 (FIG. 5) of the regulation loop assigned to the first thermo-generator source 11.

As far as the second electrical power source using solar cells is concerned, if a temperature sensor and/or a sunshine sensor is/are provided, the reference voltage V0-ϵ can be corrected by these measurements in order to be more precisely on the point of operation at maximum power. The voltage setpoint, connected to the input terminal 39 of the regulation loop assigned to the second electrical source 12 using photovoltaic cells, would be produced by a calibration circuit for the regulation reference voltage for the second source shown in FIG. 6.

The circuit for calibrating the regulation reference voltage for the second source comprises at least one input terminal 43 for a signal representative of the temperature of the photovoltaic cells, and/or an input terminal 45 for a detection signal for the sunshine exposure level of the photovoltaic sensors.

In a first variant, the circuit for calibrating the regulation reference voltage for the second source using photovoltaic cells 12 comprises a memory 44 with a single input indexed onto the value representative of a measurement of the temperature (input 43).

In a second variant, the circuit for calibrating the regulation reference voltage for the second source using photovoltaic cells 12 comprises a memory 44 with a single input indexed onto the value representative of a measurement of the level of sunshine (input 45).

In a third variant, the circuit for calibrating the regulation reference voltage for the second source using photovoltaic cells 12 comprises a memory with two inputs respectively indexed onto the value representative of a measurement of the temperature (input 43) and onto the value representative of a measurement of the level of sunshine (input 45).

The read value of the memory 44 is available at its read input 46 which produces an offset value E for the reference voltage va and said offset value is produced at the negative input of a subtractor 48 whose positive input is connected to a circuit 47 generating the voltage va characteristic of the maximum power of the photovoltaic cell generator 12. The output of the subtractor 48 is connected to the output terminal of the circuit for calibrating the regulation reference voltage for the second source using photovoltaic cells and is therefore transmitted to the reference input terminal 39 of the regulation loop assigned to the control of the second source using photovoltaic cells.

In one particular embodiment, the circuit 47 generating the voltage va characteristic of the maximum power of the photovoltaic cell generator 12 cooperates with a switching mean or means for connecting photovoltaic cells, in such a manner that the current and the voltage delivered by the photovoltaic generator operates within desired characteristics which are not a direct concern of the present invention.

It will be clearly understood that the means described may be formed by other means. In particular, as has been mentioned, the memories 44 or 57 of the calibration circuits for the reference voltages may be replaced by calculation circuits into which functions representative of the desired calibration values are programmed.

The invention claimed is:

1. An electrical management device for a vehicle electrical power supply, comprising:
    a single converter simultaneously controlling a photovoltaic source and a thermoelectric source, on board an automobile vehicle that includes at least one electrical energy storage battery.

2. The device as claimed in claim 1, wherein the converter comprises means for executing a control law depending on maximum electrical power of each source for maintaining a determined level of charge in the electrical storage battery.

3. The device as claimed in claim 2, wherein the means for executing a control law uses circuits that are insensitive to variations in voltage of the electrical storage battery.

4. The device as claimed in claim 3, wherein the means of the converter for executing a control law comprises means for managing control of the power produced by the thermoelectric source to maintain the thermoelectric source at maximum power and a reference voltage management means.

5. The device as claimed in claim 1, wherein the electrical storage battery is one of a main battery of the vehicle, and/or a specialized battery, such that the management device operates even if an internal combustion engine of the vehicle is stopped, and even if all of consumer electrical circuits are turned off.

6. The device as claimed in claim 5, wherein the converter includes a first resource preventing the battery, whose high potential would be higher than that of an electrical power source, from discharging itself into the source.

7. The device as claimed in claim 6, wherein the first resource of the converter includes two diodes whose cathodes are connected together and whose anodes are respectively connected to a high potential of each photovoltaic or thermoelectric sources, the common connection of the cathodes being connected to the battery.

8. The device as claimed in claim 7, wherein the converter includes a second resource for producing a voltage and/or a dissipated current electrical configuration signal for the photovoltaic and/or the thermoelectric source.

9. The device as claimed in claim 5, wherein the converter includes two inputs respectively connected to a first filter connected to a highest potential of the photovoltaic source and to a second filter connected to a highest potential of the thermoelectric source.

10. The device as claimed in claim 9, wherein each filter is a T-configured filter respectively including a series inductance and a parallel capacitor.

11. The device as claimed in claim 10, wherein the two filters are calculated such that the inductances are formed by connection cables themselves.

12. The device as claimed in claim 10, wherein the converter includes a controller and means for combining currents produced by the photovoltaic and thermoelectric sources.

13. The device as claimed in claim 12, wherein the means for combining the currents includes a transformer with two cores and three windings of:
a first winding connected to the input of the converter connected to the output of the filter of the thermoelectric source,
a second winding connected to the input of the converter connected to the output of the filter of the photovoltaic source, and
a third winding connected to the output of the current combining means.

14. The device as claimed in claim 13, wherein the first winding includes a second terminal connected to a switching terminal of a switching means controlled by an output signal coming from an output of the controller, and the second winding includes a second terminal connected to a switching terminal of a switch controlled by the output signal coming from an output of the controller.

15. The device as claimed in claim 14, wherein each of the switches includes a power transistor of MOS type whose gate is connected to a corresponding control signal terminal of the controller, whose drain is connected to a second terminal of one of the first or second windings of the transformer, and whose source is connected to a low potential line.

16. The device as claimed in claim 13, wherein a first high potential terminal of the third winding of the transformer is connected to the anode of a conduction diode whose cathode is respectively connected to the battery and to a first terminal of a storage capacitor whose second terminal is itself connected to a low potential line.

17. The device as claimed in claim 12, wherein the controller includes two independent regulation loops to optimally determine a control regime for each transistor or each switch.

18. The device as claimed in claim 17, wherein each regulation loop cooperates with:
a reference voltage generator configured to place the regulation loop into a mode at least close to a supply of maximum electrical power,
one or another of an input terminal of the controller to take instantaneous voltage at the output of the filter associated with the thermoelectric source; or of the input terminal of the controller to take instantaneous voltage at the output of the filter associated with the photovoltaic source using photovoltaic cells.

19. The device as claimed in claim 18, wherein each of the inputs of the controller is connected to a circuit generating a mean value of instantaneous measurement voltage of one or the other of the two sources, the output of the mean voltage generating circuit being connected to the input terminal of the regulation loop in question.

20. The device as claimed in claim 19, wherein each regulation loop includes a subtractor circuit for signals representative of an adjustment threshold for regulation of the input terminal, from which value the subtractor circuit subtracts the instantaneous or mean value of the voltage from the source transmitted to the input terminal, and a corrector circuit that includes a control pulse-train generator for a switch.

21. The device as claimed in claim 20, wherein the pulse-train generator includes means for determining frequency, duty cycle, amplitude, and waveform of the pulse train.

22. The device as claimed in claim 21, wherein the corrector circuit includes means for varying its duty cycle.

23. The device as claimed in claim 18, wherein the controller includes a circuit that calibrates a reference voltage that produces an interruption at regular intervals of a switch to update the reference voltage applied to the terminal.

24. The device as claimed in claim 23, wherein the calibration circuit further includes means for producing an interruption of the switching of a MOS transistor after a phase of gradual reduction in conduction time until it reaches zero.

25. The device as claimed in claim 23, further comprising a temperature sensor, the controller cooperating with a circuit for calculating the reference voltage $V0/2$ deduced directly from the temperature by a function for converting the temperature into a reference voltage of form $V0/2$.

26. The device as claimed in claim 18, wherein the photovoltaic source of electrical power uses solar cells, and a temperature sensor and/or a sunshine sensor are implemented to correct a reference voltage by a circuit for calibrating a regulation reference voltage for the photovoltaic source.

27. The device as claimed in claim 26,
wherein the circuit for calibrating the regulation reference voltage for the photovoltaic source using photovoltaic cells includes a memory with a single input indexed onto a value representative of a measurement of the temperature,
wherein the circuit for calibrating the regulation reference voltage for the photovoltaic source using photovoltaic cells includes a memory with a single input indexed onto a value representative of a measurement of the level of sunshine,
wherein the circuit for calibrating the regulation reference voltage for the photovoltaic source using photovoltaic cells includes a memory with two inputs respectively indexed onto the value representative of a measurement of the temperature and onto the value representative of a measurement of the level of sunshine.

28. The device as claimed in claim 27, wherein the memory produces an offset value for the reference voltage, and the offset value is produced at the negative input of a subtractor whose positive input is connected to a circuit generating the voltage characteristic of the maximum power of the photovoltaic cell generator, the circuit generating the voltage characteristic of the maximum power of the photovoltaic cell generator cooperating with a switching means or means for connecting photovoltaic cells, such that the current and the voltage delivered by the photovoltaic generator operates within desired characteristics.

* * * * *